(12) United States Patent
Hao et al.

(10) Patent No.: US 8,548,005 B2
(45) Date of Patent: Oct. 1, 2013

(54) TECHNIQUE FOR SWITCHING BETWEEN 1X AND 2X OVERSAMPLING RATE IN A TD-SCDMA RECEIVER

(75) Inventors: Yonggang Hao, Waltham, MA (US); Aiguo Yan, Andover, MA (US); Songsong Sun, Tustin, CA (US); Marko Kocic, Arlington, MA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 247 days.

(21) Appl. No.: 13/090,223

(22) Filed: Apr. 19, 2011

(65) Prior Publication Data

US 2012/0269202 A1 Oct. 25, 2012

(51) Int. Cl.
*H04J 13/00* (2011.01)
(52) U.S. Cl.
USPC .......................................................... 370/479
(58) Field of Classification Search
USPC .......................................... 370/479, 441, 334
See application file for complete search history.

(56) References Cited

U.S. PATENT DOCUMENTS

| | | | | |
|---|---|---|---|---|
| 7,532,663 B2* | 5/2009 | Lewis | | 375/150 |
| 7,626,965 B2* | 12/2009 | Cheng | | 370/335 |
| 8,311,154 B2* | 11/2012 | Agrawal et al. | | 375/316 |
| 8,315,343 B2* | 11/2012 | Murai et al. | | 375/346 |
| 2005/0078640 A1* | 4/2005 | Kim et al. | | 370/335 |
| 2012/0027135 A1* | 2/2012 | Sgraja et al. | | 375/343 |

* cited by examiner

*Primary Examiner* — Mark Rinehart
*Assistant Examiner* — Mohammad Anwar
(74) *Attorney, Agent, or Firm* — Winston Hsu; Scott Margo

(57) ABSTRACT

A TD-SCDMA receiver is provided that includes a joint detection (JD) block receiving a first input signal from a channel estimation block for signal detection. A short channel detection (SCD) block receives the first input signal and detecting the presence/absence of an AGWN-like channel based on the first input signal from the channel estimation block. The SCD block switches the JD block between 1× and 2× oversampling rates by sending to the JD block a second input signal.

19 Claims, 5 Drawing Sheets

TECHNIQUE FOR SWITCHING BETWEEN 1X AND 2X OVERSAMPLING RATE IN A TD-SCDMA RECEIVER

BACKGROUND OF THE INVENTION

The invention is related to the field of short channel detection (SCD), and in particular to an SCD block providing switching between 1× and 2× joint detection (JD).

Experiments have confirmed that a time division synchronous code division multiple access (TD-SCDMA) receiver with a 2× oversampling rate can outperform one with a 1× sampling rate in most fading channels. The gain is particular significant in scenarios with strong neighboring cell interference. However, a 1× receiver can still outperform a 2× receiver in scenarios with AGWN-like channel when close-to optimal timing is available. In addition, 1× oversampling rate of a JD consumes less power. To achieve better performance in both scenarios, a mechanism is needed to switch between 1× and 2× in the inner receiver. The invention addresses this limitation in the prior art.

SUMMARY OF THE INVENTION

According to one aspect of the invention, there is provided a TD-SCDMA receiver. The TD-SCDMA receiver includes a joint detection (JD) block receiving a first input signal from a channel estimation block for signal detection. A short channel detection (SCD) block receives the first input signal and detects the presence/absence of an additive Gaussian white noise (AGWN)-like channel based on the first input signal from the channel estimation block and switches the JD block between 1× and 2× oversampling rates by sending to the JD block a second input signal.

According to another aspect of the invention, there is provided a method of performing TD-SCDMA receiver operations. The method includes providing a joint detection (JD) block for receiving a first input signal from a channel estimation block for signal detection. Also, the method includes detecting the presence/absence of an AGWN-like channel based on the first input signal from the channel estimation block using a short channel detection (SCD) block, the SCD block switches the JD block between 1× and 2× oversampling rates by sending to the JD block a second input signal.

According to another aspect of the invention, there is provided a method of performing short channel detection. The method includes obtaining inputs from a channel estimation block and aligning one or more RRC (Root-Raised-Cosine) filter sequences with a desired channel impulse response (CIR) window using the inputs. Also, the method includes building a sequence of active CIR using the one or more RRC filter sequences and calculating the detection metric for each timeslot using the sequence of active CIR. Furthermore, the method includes calculating the decision metric for each subframe and periodically, every M subframes, reading the output of an exponential filter and comparing the filtered decision metric with a pre-defined threshold.

DETAILED DESCRIPTION OF THE INVENTION

The invention provides a technique for switching between 1× and 2× oversampling rate in a TD-SCDMA receiver. The invention achieves better performance by providing a mechanism needed to switch between 1× and 2× oversampling rate in an inner receiver.

Figure 1:
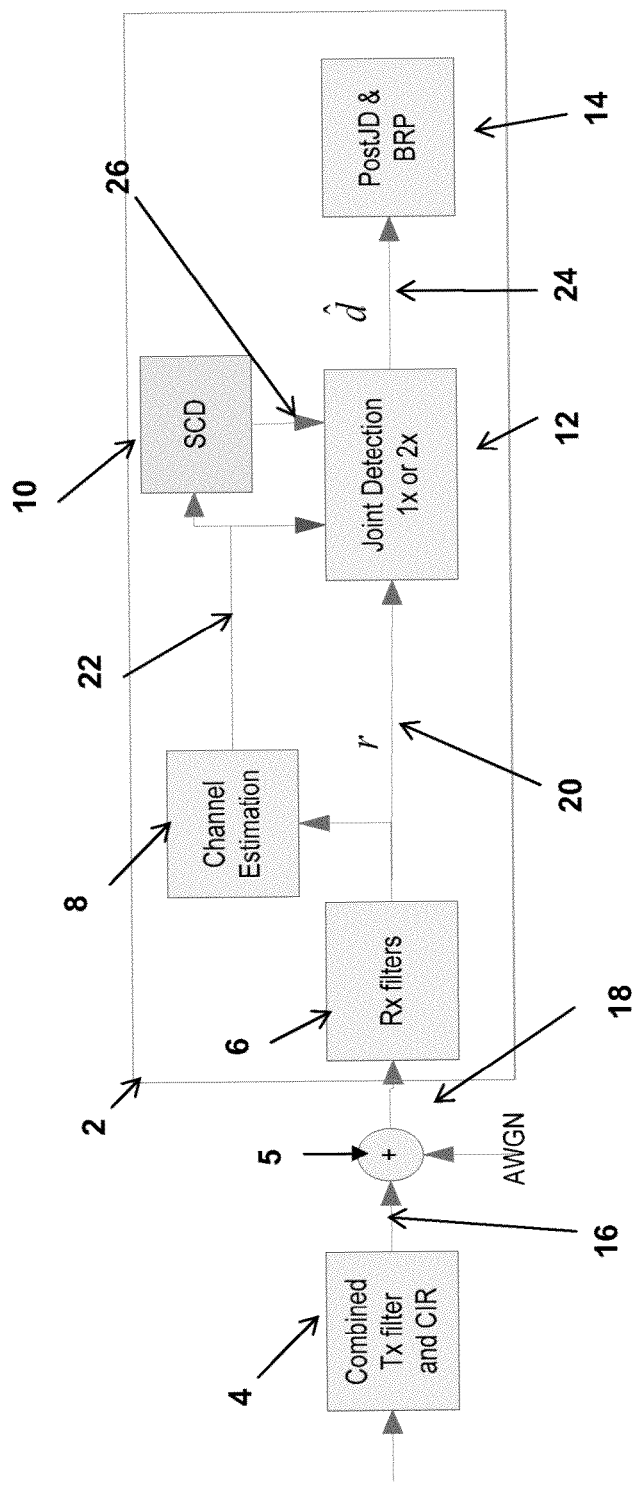
FIG. 1 is a schematic diagram illustrating the receiver side of a TD-SCDMA system used in accordance with an embodiment of the invention.

FIG. 1 is a schematic diagram illustrating an inner receiver 2 of a TD-SCDMA system used in accordance with an embodiment of the invention. The inner receiver 2 includes blocks 6, 8, 10, 12, and 14. A receiver (Rx) filters block 6 receives a first signal 18, which includes the AWGN added at the receiver front end and the transmitted signal subject to air propagation channel (CIR) and transmitter (TX) filters. The latter two are abstracted as block 4. The Rx filters block 6 provides as output a second signal 20.

The second signal 20 goes through a channel estimation (CE) block 8 to generate the estimation of the combined CIR, including Tx/Rx filters and air propagation channel. The estimation of CIR 22 is forwarded to a joint detection (JD) block 12 for symbol detection and a short channel detection (SCD) block 10 for switching between 1× and 2× oversampling rate in the JD block 12. The JD block 12 also receives as input the second signal 20. Thereafter, soft detection of symbols 24 is passed to Post JD and bit rate processor (BRP) block 14 for final decoding.

In this case, the channel estimation block 8 runs in a 2× oversampling rate. The JD block 12 sampling rate can switch between 1× and 2×. The SCD block 10 detects the presence/absence of an AGWN-like channel based on inputs from the channel estimation block 8 and switches the JD block 12 between 1× and 2× oversampling rate by sending to the JD block 12 an output signal 26.

Figure 2:
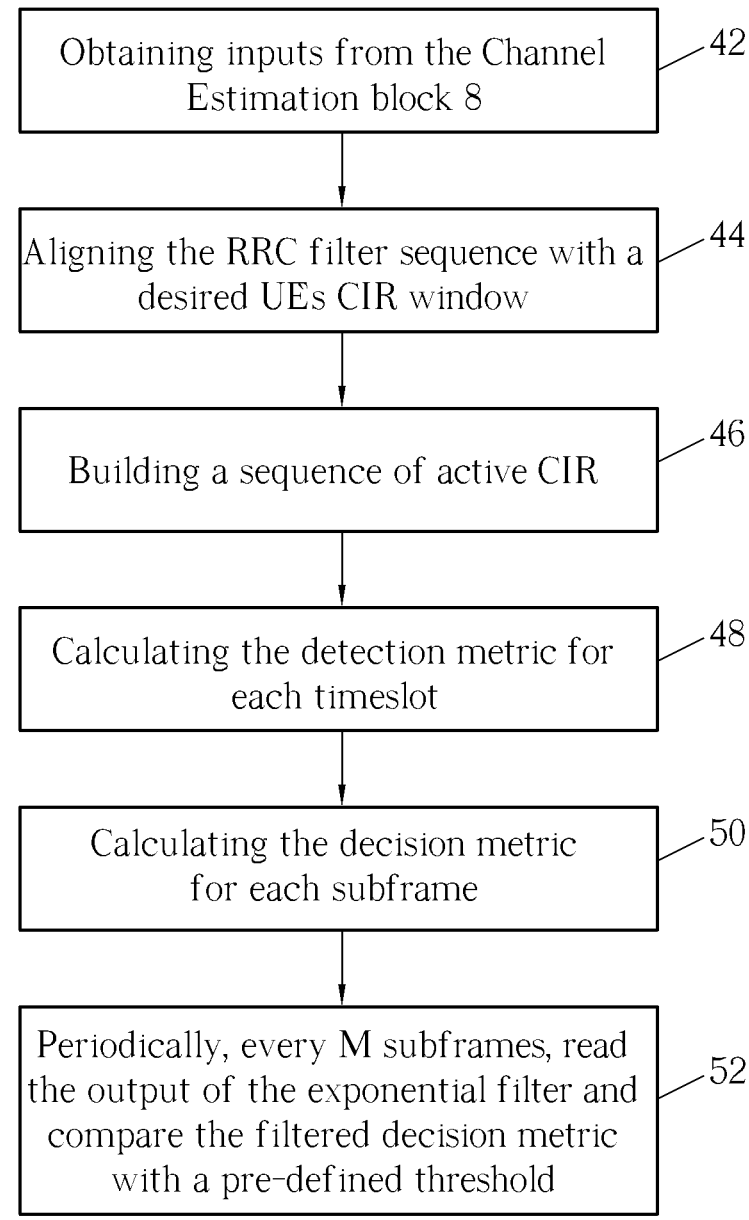
FIG. 2 is a process flow diagram illustrating the steps performed in an SCD block structure used in accordance of an embodiment of the invention.

The process flow 40 for the SCD block 10 is shown in FIG. 2. The SCD block 10 obtains inputs from CE block 8 and higher layer, as shown in step 42. Inputs include channel impulse response (CIR) estimation, midamble allocation scheme, traffic load type, active midamble detection results and etc. For each downlink time slot, Root-Raised-Cosine (RRC) filter sequences, which are calculated offline, are aligned with a desired user equipment (UE)'s CIR window, as shown in step 44. RRC filter sequences are the Impulse Response sequence of the RRC filter (combination of TX and RX filter). CIR Window is a sequence of CIR estimation corresponding to one training sequence (called midamble).

Figure 3A:
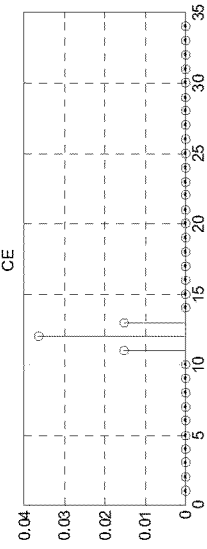
FIGS. 3A-3D are graphs illustrating the alignment between a channel impulse response (CIR) window and an RRC sequence used in accordance with an embodiment of the invention.
Figure 3B:
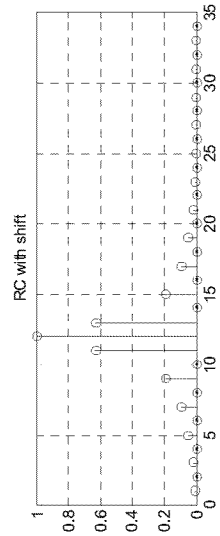
Figure 3C:
Figure 3C:
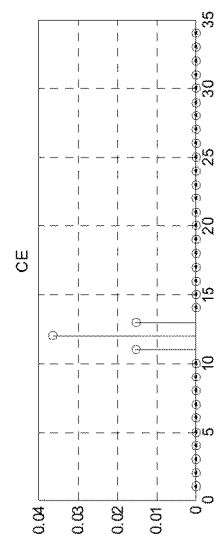
Figure 3D:
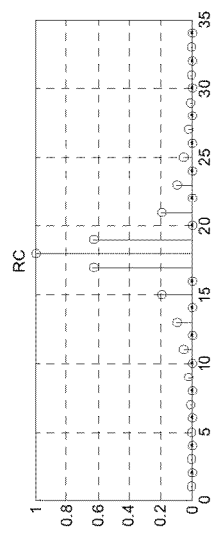

To align impulse response (IR) of RRC with a CIR window, one needs to shift IR of RRC so that the peak tap in CIR window and the peak of IR of RRC overlap with each other. FIGS. 3A-3D illustrate this alignment. FIGS. 3A and 3C are CIR windows and FIGS. 3B and 3D are IR sequence of RRC. FIGS. 3A-3B are those without alignment and FIGS. 3C-3D are results after alignment. The IR sequence after alignment is denoted by $RC_{shift}$. Notice that in the division multiple access (DMA) scheme, the desired UE might have more than one CIR windows, but these windows should be identical except for magnitude if the channel estimation block 8 performs well.

Also, one must build a sequence of active CIR $\hat{\underline{h}}$ consisting active windows of both desired UE and non-desired UEs, as shown in step 46, defined as:

$$\hat{\underline{h}} \triangleq \begin{bmatrix} \hat{h}_0 \\ \vdots \\ \hat{h}_{L-1} \end{bmatrix}, \quad (1)$$

where L is the number of active CIR windows.

Correspondingly one can define the sequence of $\underline{R}$ as:

$$\underline{R} \triangleq \begin{bmatrix} RC_{shift} \\ \vdots \\ RC_{shift} \end{bmatrix} \quad (2)$$

In other words, $\underline{R}$ consists of L identical $RC_{shift}$. The detection metric is calculated for each timeslot, as shown in step 48. This metric is the correlation coefficient between $\hat{\underline{h}}$ and $\underline{R}$:

$$\gamma(n,j) = \frac{|\langle \hat{\underline{h}} \quad \underline{R} \rangle|}{\sqrt{\langle \hat{\underline{h}} \quad \hat{\underline{h}} \rangle \langle \underline{R} \quad \underline{R} \rangle}} \quad (3)$$

where n and j are the indexes for subframe and time slot, respectively.

Figure 4:
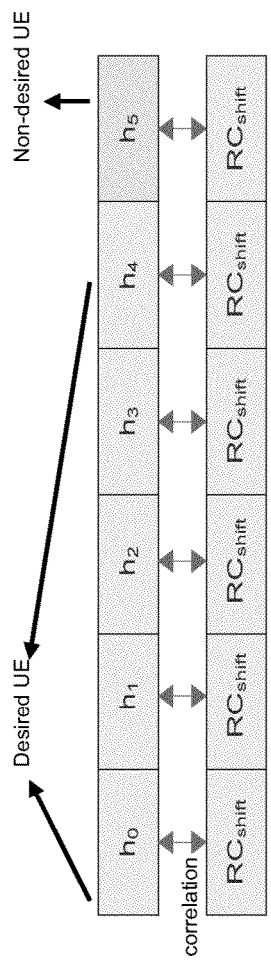
FIG. 4 is a schematic diagram illustrating the metric generation for each time slot in a DMA scheme used in accordance with an embodiment of the invention.

FIG. 4 shows the metric generation for each time slot in a DMA scheme. Each of the CIR $h_0$-$h_4$ is within the desired UE and $h_5$ is a non-desired UE. Each of the CIR $h_0$-$h_4$ is correlated with $RC_{shift}$ while the non-desired UE is also correlated with an $RC_{shift}$.

Figures 5A, 5B:
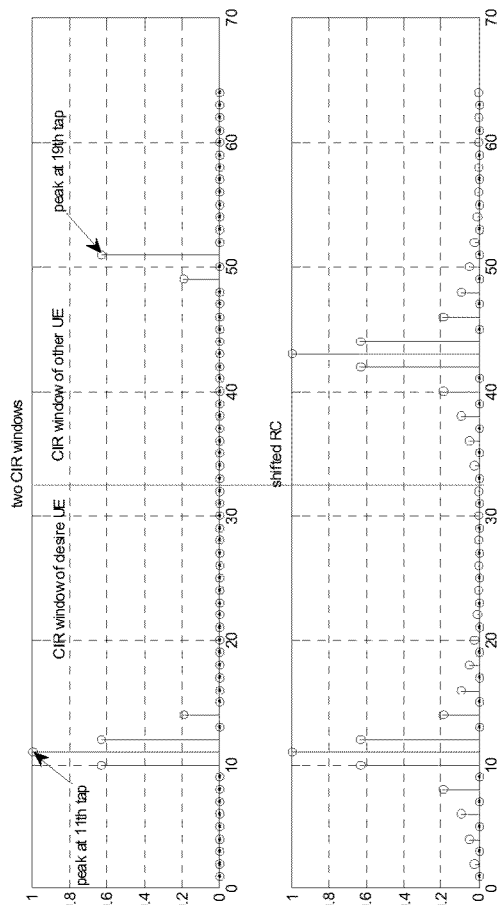
FIGS. 5A-5B are graphs illustrating the alignment of two CIR windows and an RRC sequence in a DMA scheme.

The alignment was carried only with reference to the desired UE, as shown in FIG. 5A. If a non-desired UE has its peak at other position, it still uses the same shift RRC window as that of the desired UE, as shown in FIG. 5B.

The complexity of this metric can be further reduced. The numerator can be simplified as:

$$|\langle \hat{\underline{h}} \quad \underline{R} \rangle| = \left| \sum_{l:active} \langle \hat{h}_l \quad RC_{shift} \rangle \right| \quad (4)$$
$$= \left| \left\langle \sum_{l:active} \hat{h}_l \quad RC_{shift} \right\rangle \right|$$
$$\triangleq |\langle \hat{h}_s \quad RC_{shift} \rangle|$$

$$\hat{h}_s \triangleq \sum_{l:active} \hat{h}_l$$

An alternative to metric in (3) and (4) in DMA case is shown as follows. In presence of multiple active windows, one can obtain an individual metric for each active window, then the minimum metric of all these individual metrics is used as the metric for this time slot. In particular, the metric for $k^{th}$ active window in $j^{th}$ time slot is:

$$\gamma_k = \left| \sum_{i=0}^{31} \hat{h}_{k,j} RC_{shift} \right| / \sqrt{\sum_{i=0}^{31} |\hat{h}_{k,j}|^2 \sum_{i=0}^{31} |RC_{shift}|^2} \quad (1.1)$$

It will be appreciated that all windows use the same $RC_{shift}$, which is generated with reference to desired UE's peak tap. Then the metric for the whole timeslot is defined as:

$$\gamma(n,j) = \min_{k=1\sim L} (\gamma_k) \quad (1.2)$$

In short, with this alternative SCD can switch to 1× only if all active UE's CE are AWGN-like and they are aligned.

The decision metric is calculated for each subframe as shown in step 50. In DL, there might be more than one time slot in each subframe. The overall decision metric for each subframe is the average of those of all time slots:

$$\gamma_{inst}(n) = \frac{\sum_j \gamma(n,j)}{N_{activeslot}} \quad (7)$$

$N_{activeslot}$: number of active slots

Each sub-frame's metric is passed through an exponential filter as shown in step 50. The exponential filter having the following properties:

$\gamma_{ave}(n) = (1-\alpha)\gamma_{ave}(n-1) + \alpha\gamma_{inst}(n)$ $\gamma_{ave}(n)$: averaged metric after subframe $n$ $\gamma_{inst}(n)$: instant metric. at subframe $n$ α: design parameter (1.3)

This exponential filter is a low pass filter, which can "average" the decision metrics over long period of observation.

Periodically, e.g., every M subframes, the output of the exponential filter is read and compared the filtered decision metric with a pre-defined threshold, as shown in step 52. If the metric is greater than the threshold, it indicates the presence of an AGWN-like channel and the SCD block signals the JD block to switch to 1× sampling rate. Otherwise, JD remains running in 2×. The threshold is a design parameter. With theoretical analysis and experiments, 0.94 is a good candidate value.

Although the present invention has been shown and described with respect to several preferred embodiments thereof, various changes, omissions and additions to the form and detail thereof, may be made therein, without departing from the spirit and scope of the invention.

What is claimed is:

1. A time division synchronous code division multiple access (TD-SCDMA) receiver comprising:
    a joint detection (JD) block receiving a first input signal from a channel estimation block for signal detection; and
    a short channel detection (SCD) block receiving the first input signal and detecting the presence/absence of an additive Gaussian white noise (AGWN)-like channel based on the first input signal from the channel estimation block to generate a detection result, said SCD block switches the JD block between 1× and 2× oversampling rates by sending to the JD block a second input signal according to the detection result.

2. The TD-SCDMA receiver of claim 1, wherein the first input signal is produced by the channel estimation block receiving an output from a receiver (Rx) filter block.

3. The TD-SCDMA receiver of claim 1, wherein the channel estimation block operates in a 2× oversampling rate.

4. The TD-SCDMA receiver of claim 1, the first input signal comprises information regarding midamble allocation scheme, traffic load type, and active midamble detection results.

5. The TD-SCDMA receiver of claim 1, wherein the SCD block utilizes a plurality of Root-Raised-Cosine (RRC) filter sequences that are aligned with one or more channel impulse response (CIR) windows belonging to a desired user equipment (UE).

6. The TD-SCDMA receiver of claim 1, wherein the SCD block builds a sequence of active CIR.

7. The TD-SCDMA receiver of claim 1, wherein the SCD block calculates detection metrics for each timeslot.

8. The TD-SCDMA receiver of claim 1, wherein the SCD block calculates decision metrics for each subframe.

9. The TD-SCDMA receiver of claim 1, wherein the SCD block periodically, every M subframes, reads the output of an exponential filter and compares the filtered decision metric with a pre-defined threshold.

10. A method of performing time division synchronous code division multiple access (TD-SCDMA) receiver operations comprising:
providing a joint detection (JD) block for receiving a first input signal from a channel estimation block for signal detection; and
detecting the presence/absence of an additive Gaussian white noise (AGWN)-like channel based on the first input signal from the channel estimation block using a short channel detection (SCD) block to generate a detection result, the SCD block switches the JD block between 1× and 2× oversampling rates by sending to the JD block a second input signal according to the detection result.

11. The method of claim 10, wherein the first input signal is produced by the channel estimation block receiving an output from a receiver (Rx) filter block.

12. The method of claim 10, wherein the channel estimation block operates in a 2× oversampling rate.

13. The method of claim 10, wherein the first input signal comprises information regarding midamble allocation scheme, traffic load type, and active midamble detection results.

14. The method of claim 10, wherein the SCD block utilizes a plurality of Root-Raised-Cosine (RRC) filter sequences that are aligned with one or more channel impulse response (CIR) windows belonging to the a desired user equipment (UE).

15. The method of claim 10, wherein the SCD block builds a sequence of active CIR.

16. The method of claim 10, wherein the SCD block calculates detection metrics for each timeslot.

17. The method of claim 10, wherein the SCD block calculates decision metrics for each subframe.

18. The method of claim 10, wherein the SCD block periodically, every M subframes, reads the output of an exponential filter and compares the filtered decision metric with a pre-defined threshold.

19. A method of performing short channel detection comprising:
obtaining inputs from a channel estimation block;
aligning one or more Root-Raised-Cosine (RRC) filter sequences with a desired channel impulse response (CIR) window using the inputs;
building a sequence of active CIR using the one or more RRC filter sequences;
calculating the detection metric for each timeslot using the sequence of active CIR;
calculating the decision metric for each subframe; and
periodically, every M subframes, reading the output of an exponential filter and comparing the filtered decision metric with a pre-defined threshold.

* * * * *